Patented Jan. 4, 1927.

1,612,869

UNITED STATES PATENT OFFICE.

WILLIAM HOFFMAN KOBBÉ, OF NEW YORK, N. Y., ASSIGNOR TO TEXAS GULF SULPHUR COMPANY, OF BAY CITY, TEXAS, A CORPORATION OF TEXAS.

SULPHUR COMPOSITION.

No Drawing. Application filed August 14, 1923. Serial No. 657,434.

This invention relates to corrosion-resisting compositions and has for its object the provision of an improved corrosion-resisting composition.

The present invention contemplates the provision of an improved corrosion-resisting composition possessing superior strength, which is not relatively brittle, which can be easily and accurately cast into any desired form, and which, when so cast, will retain its shape without warping or other deformation. The improved composition effectively resists the action of acids, and such substances as alum, perchlorate of iron and both ferrous and ferric chloride, and the like. In consequence of these physical properties, the improved composition may be used in a variety of ways and in the construction of many different articles. Thus, it may be employed with advantage in the construction of electrolytic and other tanks, table tops, floors, and for many other purposes. Many articles now made of ceramic ware may advantageously be constructed of my improved composition.

Sulphur - containing compositions have heretofore been proposed consisting of sulphur and carbon in the form of powdered anthracite coal, but I have discovered that a much superior composition is obtained when sulphur and finely divided coke are combined in suitable proportions and under proper conditions. Such a composition will possess the above mentioned and other physical qualities and advantages. Coke being porous and of an extremely rough texture even in a finely divided state, makes an excellent bond with the sulphur and produces a composition which is stronger and more durable than the sulphur-coal composition. Moreover, the specific gravity of coke is approximately the same as that of sulphur, which is of advantage in the manufacture of the composition inasmuch as the materials do not tend to separate by gravity.

Sulphur melts at about 115° C. and at this temperature, and at temperatures slightly higher, and under atmospheric conditions, pours like water. I have found that when approximately 35% of finely divided coke is added to melted sulphur at a temperature slightly above the melting point, for example, at about 125° C., the resulting composition is a freely flowing liquid which may be cast with great facility. Objects cast of this composition will accurately reproduce the smallest variations in the configuration of the matrix. This composition is admirably adapted for use as a corrosion-resisting composition as it possesses the required tensile strength, is not relatively brittle, and may be readily and accurately cast by pouring in an ordinary mold.

In carrying out the invention, the coke is first ground to a relatively fine powder so that it will pass through a screen of about 90 to 100 mesh. The sulphur is then melted and the temperature raised to slightly above the melting point, for example, about 125° C., and about 35% by weight of finely divided coke is then poured into the melted sulphur and intimately mixed therewith. It is desirable to melt the sulphur in a steam-jacketed kettle so as to obtain an even heating of the sulphur and so that the temperature may be easily controlled.

Another method of making the composition is to mix the sulphur and coke both in a powdered form. The sulphur, as well as the coke, is ground to a relatively fine powder and then the two are mixed in the proper proportions in any suitable apparatus. This dry mixture is then heated to a point slightly above the melting point of sulphur and is then ready for use.

The fact that the specific gravity of the finely divided coke is substantially the same as that of the sulphur greatly facilitates the preparation of the composition by either of these methods. In the first method the coke remains in suspension in the melted sulphur, and it is, therefore, unnecessary to provide for agitation of the molten mass while it is being poured. It is only necessary to stir the two substances so as to thoroughly mix them. In the second method after the powdered coke and powdered sulphur have been stirred together there is no tendency for the two substances to separate by gravity so that the product may be shipped, if desired, in this form to the point where it is desired to use it. When the composition is prepared according to the first method, it may be poured as soon as it is mixed, or it may be allowed to solidify and then be remelted at some subsequent time when it is desired to use it.

The strength of my improved corrosion-resisting composition depends upon the relative proportions of the sulphur and coke and the fineness of the coke, in general increasing as both the amount and fineness of the coke employed is increased. The breaking tests which I have made of samples of the composition indicate a tensile strength of from 400 to 1000 pounds per square inch depending on the proportion of coke and fineness of the mesh employed. The maximum strength appears to occur with approximately 60% coke and 40% sulphur, and such a composition is extremely useful for the manufacture of articles which are capable of being molded under pressure and where a relatively high tensile strength is required, but it is not suitable for casting by pouring into a mold because such a high percentage of coke renders the composition too viscous even at temperatures slightly above the melting point of sulphur. Such a composition containing a relatively high percentage of coke may also be employed advantageously as a lining for tanks where it can be applied in much the same way as mortar is applied.

The composition of my invention is particularly useful for the construction of electrolytic tanks of various kinds, and especially in the construction of those tanks which are employed in the manufacture of storage batteries, and which are known as "forming" tanks. In this industry the storage battery plates, after the lead oxide paste has been pressed into the lead grids, are immersed in the electrolyte in suitable tanks about 8 inches wide, 1 foot deep, and 1 foot long, and then connected with suitable electric circuits in order to properly "form" the plates.

These forming tanks must be constructed of some material which is acid-resisting, strong enough to withstand the rather rough treatment which they receive in being handled about the factory, and it is also desirable that they be provided with projections or notches in their side walls to accurately hold the plates in position. These tanks are now constructed of ceramic ware but this material is extremely unsatisfactory. In order to render ceramic ware acid-resisting, it must be glazed. This process is in itself expensive, and, furthermore, if even relatively minute areas are left uncoated by the glaze, the article must be discarded. Hence, the cost of manufacture of forming tanks of this material is high, and, in addition the tanks warp and lose their shape during the process of manufacture to such an extent that the battery plates are liable to injury when slid into the notched walls.

Such a battery forming tank may be cast from my improved composition and possesses all of the advantages of the ceramic ware, with none of its disadvantages. It does not warp; the notches for holding the plates can be accurately formed, and remain in their position; there is no waste in the process of manufacture; and the cost is a great deal less than that of forming tanks made of ceramic ware. The strength is entirely adequate to withstand the rough handling to which the tanks are subjected. My improved composition is corrosive-resisting of itself, and does not have to be glazed to render it so.

Other tanks, vats, and the like, may be advantageously constructed of the improved composition, especially when they are used to contain acids, and other corrosive substances. Such tanks may be employed in large numbers in the chemical industry for storage purposes. They may also be used in paper mills for the storage of the sulfite liquor. In the textile industry dyeing and treating vats made of my improved composition will be just as serviceable and less expensive than those now employed. The composition may also be used in the preparation of food for the construction of fruit-cooking vessels, vinegar tanks, and tanks and vessels used in the packing industry.

A still further use to which the composition may be put is in the construction of work-table tops, especially where it is desirable to provide a work-table top of an acid-resisting character, such, for example, as is necessary in plants where storage batteries are manufactured.

Tanks, or other vessels, constructed of the improved composition will safely withstand a temperature of 100° C. and, as a matter of fact, are not injured by temperatures somewhat higher than this, inasmuch as they are not destroyed until the melting point of sulphur is reached, viz, 115° C., because sulphur does not become viscous, but passes directly from the solid to the liquid state. It is, therefore, possible to boil water in them at atmospheric pressure by employing heating coils within the vessel.

Vessels constructed in accordance with the invention may, if desired, be reinforced in any appropriate manner, such, for example, as by means of the so-called metal lath. Thus, a sheet of expanded metal lath may be shaped to conform to the shape of the vessel desired, such, for example, as a cylindrical tank or pipe, and held within the mold so that when the molten composition is poured, it will entirely surround the expanded metal reinforcement, and leave it embedded within the object. A further modification of the method of constructing reinforced articles where relatively great strength is required is to employ the composition containing, for example, 60% of coke and 40% of sulphur, and apply it to the reinforcing structure in much the same manner as mortar is applied.

In the construction of vessels and other objects of the improved composition, whether or not reinforced, a portion of the mold may be poured at one time and allowed to solidify and the remainder of the mold poured at a later time, yet the union between the two portions will be just as homogeneous, continuous, and strong as when the whole article is cast at a single pouring. This characteristic of the composition is important as it facilitates the construction of extremely large tanks which it would be impossible to pour at one time, and which, therefore, may be constructed of my improved composition in much the same manner as concrete structures are made.

A particular method of making reinforced vessels or objects for which my improved composition is well adapted is as follows. A reinforcing structure conforming to the shape of the object is first constructed from woven wire, expanded metal lath, or the like. This structure is then dipped in a bath of the molten composition and upon removal therefrom a quantity of the composition will be found to firmly adhere to the reinforcing structure. This is allowed to solidify and then the dipping is repeated until the desired thickness of the corrosive-resisting composition is obtained. The composition will be found to build up uniformly with the repeated dippings and the method may be employed to advantage in the construction of certain objects.

An example of one particular vessel which may be advantageously made in this manner is a cylindrical tank. The cylindrical walls of the tank are formed first by slowly rotating a cylinder of reinforcing material so that the lower portion thereof dips into a molten bath of the improved composition. This operation is continued until the cylindrical walls are completely formed, after which the cylinder is placed in an appropriate mold for casting the bottom of the vessel. The bottom may be reinforced or not, as is desired, and is cast in the manner described previously, and will be found to unite completely with the previously formed side walls of the tank.

The corrosion-resisting composition of the invention is more or less metallic in its physical appearance, and, when tapped with a hammer, has a metallic ring. It may be machined without difficulty and is capable of taking an extremely high polish. The natural color is an attractive dark gray.

I claim:

1. A corrosion-resisting composition composed of finely divided coke and a preponderating amount of sulphur.

2. A corrosion-resisting composition comprising about 35% of finely divided coke mixed with about 65% of melted sulphur and allowed to congeal.

3. A corrosion-resisting composition composed of not less than 60% of sulphur and the balance finely divided coke.

4. A corrosion-resisting composition composed of from 40 to 65% of sulphur and the balance finely divided coke.

In testimony whereof I affix my signature.

WILLIAM HOFFMAN KOBBÉ.